United States Patent
Maier et al.

(10) Patent No.: US 11,360,453 B2
(45) Date of Patent: Jun. 14, 2022

(54) METHOD FOR OPERATING A SYSTEM

(71) Applicant: Balluff GmbH, Neuhausen a.d.F. (DE)

(72) Inventors: Jorg Maier, Filderstadt (DE); Jochen Streib, Ostfildern (DE); Martin Osterfeld, Schlaitdorf (DE); Stephan Langer, Filderstadt (DE); Roland Schafer, Rottweil (DE); Albert Dorneich, Ostfildern (DE); Andrea Hiller-Brod, Weilheim (DE)

(73) Assignee: BALLUFF GMBH, Neuhausen ADF (DE)

( * ) Notice: Subject to any disclaimer, the term of this patent is extended or adjusted under 35 U.S.C. 154(b) by 0 days.

(21) Appl. No.: 17/218,749

(22) Filed: Mar. 31, 2021

(65) Prior Publication Data

US 2021/0318663 A1    Oct. 14, 2021

(30) Foreign Application Priority Data

Apr. 8, 2020 (DE) .......................... 102020109858.8

(51) Int. Cl.
*G05B 19/042*   (2006.01)
*G06Q 30/00*    (2012.01)

(52) U.S. Cl.
CPC ....... *G05B 19/0428* (2013.01); *G06Q 30/018* (2013.01); *G05B 2219/24024* (2013.01)

(58) Field of Classification Search
None
See application file for complete search history.

(56) References Cited

U.S. PATENT DOCUMENTS

| | | | | |
|---|---|---|---|---|
| 5,764,509 | A * | 6/1998 | Gross | G05B 23/0254 706/45 |
| 8,612,029 | B2 * | 12/2013 | Cottrell | G05B 23/0229 714/45 |
| 11,063,965 | B1 * | 7/2021 | Putman | G06F 21/566 |
| 2008/0125898 | A1 * | 5/2008 | Harvey | G05B 23/0251 700/110 |
| 2008/0262795 | A1 * | 10/2008 | Webb | G05B 23/0283 702/183 |
| 2010/0138026 | A1 * | 6/2010 | Kaushal | G06N 5/04 706/23 |
| 2010/0257410 | A1 * | 10/2010 | Cottrell | G05B 23/0229 714/45 |
| 2012/0123737 | A1 * | 5/2012 | Hansen | H01L 21/67288 702/183 |
| 2020/0204684 | A1 * | 6/2020 | Hashimoto | G10L 25/51 |
| 2021/0103654 | A1 * | 4/2021 | Putman | G06F 21/552 |

* cited by examiner

*Primary Examiner* — Jennifer L Norton
(74) *Attorney, Agent, or Firm* — GableGotwals

(57) ABSTRACT

In a method for operating a system, which has a plurality of sensors (21, 22, 23), the sensors (21, 22, 23) provide first sensor data (11) to a primary process (31). Furthermore, the sensors (21, 22, 23) provide second sensor data (12). At least a part of the first sensor data (11) and the second sensor data (12) is subjected to an analysis (13). A result (16) of the analysis (13) is used in at least one secondary process (33) of the primary process (31).

6 Claims, 3 Drawing Sheets

METHOD FOR OPERATING A SYSTEM

CROSS-REFERENCE TO RELATED APPLICATIONS

This United States application claims priority to German Patent Application No. 10 2020 109 858.8 filed 8 Apr. 2020, which is incorporated herein by reference.

The present invention relates to a method for operating a system which has a plurality of sensors. Furthermore, the present invention relates to a computer program which is configured to perform each step of the method, and to a machine-readable storage medium on which the computer program is stored.

PRIOR ART

In the food industry, process safety plays a primary role. On the one hand, it is the prerequisite for compliance with statutory regulations or guidelines, for example relating to hygiene, and on the other hand, during the manufacturing process, that the food is treated in such a way that a desired or required final quality can be achieved. This requirement leads to a plurality of parameters of the food production process being detected virtually completely by sensor technology. This detection is used to control, monitor and document the process parameters. For this purpose, intelligent sensor systems are increasingly being used, which, for example, monitor their own operating status. This results in a large amount of data being obtained which is not used to monitor the primary process.

DE 10 2007 024 006 A1 describes a measuring device for detecting a primary measured variable, which can also detect a secondary measured variable by means of a passive sensor. The secondary measurement results provide information about the condition of the measuring device, about the condition of the measuring point and about the condition of the medium in which the measurement takes place.

In addition to the primary process, one or more secondary processes (support processes) usually run in a food production system. Such secondary processes are used, for example, for cleaning, troubleshooting and maintenance of the system. Sensors are also required to control and monitor the secondary processes.

It is an object of the present invention to provide a method which makes it possible, in a system in which secondary processes run in addition to a primary process, to use fewer sensors than is the case in conventional system designs, or, using an unchanged number of sensors, to provide more information than is possible in conventional system designs.

DISCLOSURE OF THE INVENTION

In one aspect of the invention, this object is solved by a method for operating a system which has a plurality of sensors. The sensors provide first sensor data to a primary process. In this context, the primary process is understood to be the process that is used to perform the main function of the system. The first sensor data can be used in the primary process to control, regulate, check, monitor or document the primary process.

Furthermore, the sensors provide second sensor data. This can be implemented, in particular, by a sensor having several sensor elements in its housing which measure different sensor data. However, it is also possible, for example, for the second sensor data to be determined computationally in a computing element of the sensor using the first sensor data. In particular, the sensors can be intelligent sensors or smart sensors or virtual sensors.

At least a part of the first sensor data and a part of the second sensor data is subjected to an analysis in the method. Preferably, the analysis is a pattern query. In the comparison, at least one sensor data pattern is compared with at least one reference pattern. Reference patterns are thereby obtained by depositing a target course of the respective data with time. Generating reference patterns takes place in particular in a learning process or training process. The result of the comparison consists of a measure of the agreement between the sensor data pattern and reference pattern. The result of the analysis is provided to at least one secondary process of the primary process in order to be used in it.

Depending on the type of the secondary process, a different part of the first and second sensor data may be relevant to this. The part of the first and second sensor data is therefore selected depending on the secondary process.

Pattern queries can be generated, in particular, using a support vector machine, a decision tree, machine learning, a neural network, fuzzy logic or an AI (artificial intelligence) application.

A preferred use of the result of the comparison is that the secondary process is triggered and/or terminated depending on the result. If it is possible to trigger several different secondary processes, then several comparisons can be performed in parallel for the different secondary processes until it is determined that the condition for starting one of the secondary processes is met. In particular, it can be provided that a different part of the first sensor data and the second sensor data is evaluated for checking the start condition of each secondary process. If a secondary process has already been started, it is known in the following which part of the first sensor data and the second sensor data is to be subjected to an analysis in order to check whether the secondary process is to be terminated again. Only this analysis must then be performed.

In one embodiment of the method, the triggering can be performed immediately by transmitting a trigger command to a controller of the system. In another embodiment of the method, the triggering occurs indirectly by visualising the trigger command to an operator of the system. The operator can subsequently perform the triggering manually.

The result of the analysis can preferably also be used to monitor the secondary process. For this purpose, after the secondary process has been started, a part of the first sensor data and the second sensor data which is relevant for monitoring can be selected and subjected to an analysis, and measures can be taken depending on the result of the analysis. If the analysis is a pattern query, it is particularly preferred that the secondary process is adjusted if a deviation between the sensor data pattern and the reference pattern exceeds a predeterminable deviation tolerance. In a particularly simple embodiment of the comparison, such a tolerance exceedance is already assumed if the deviation between the sensor data pattern and the reference data pattern exceeds a predeterminable threshold at any time. A further implementation of the comparison can consist of defining maximum values and minimum values around the reference pattern and triggering an adjustment when a value of the sensor data pattern exceeds a maximum value and/or falls below a minimum value.

The adaptation of the secondary process can also be done by controlling the secondary process completely by means of the result of the analysis.

Furthermore, the result of the analysis can in particular also be used to document the secondary process.

Likewise, it is preferred that the result is used to generate an occurrence notification of the secondary process. The occurrence notification can be an occurrence notification of the running secondary process as well as an occurrence notification that is generated in the context of the check whether the secondary process should be started. In particular, the occurrence notification can in particular be that the analysis has concluded that it is not necessary to start the secondary process.

The pattern query represents an anomaly detection in which misinterpretations may occur. By evaluating these misinterpretations, further target states of the system can be determined in addition to already known target states. It is therefore preferred that during the secondary process, the at least one reference pattern is adjusted by a learning process. This adjustment can consist in particular of changing the reference pattern or adding a further reference pattern to a group of reference patterns.

To prevent a sensor malfunction from negatively affecting the stored reference patterns by performing an empirical adjustment based on erroneous sensor data, it is preferred that the at least one sensor data pattern is compared to stored historical sensor data patterns. This comparison can occur automatically or can be manually triggered by an operator of the system. Furthermore, it is preferred that in the presence of redundant sensors which provide sensor data of the same type, a plausibility check of the sensor data is performed.

In a further aspect, the object is solved by a computer program which is set up to carry out each step of the method, in particular when it runs on a computing device or on an electronic control device. It makes it possible to implement different embodiments of the method on conventional computing devices and control devices without having to undertake constructive changes on it. In order to install the computer program on a computing device or control device, in yet another aspect of the invention, a machine-readable storage medium is provided on which the computer program is stored.

BRIEF DESCRIPTION OF THE DRAWINGS

Exemplary embodiments of the invention are depicted in the drawings and explained in more detail in the following description.

EXEMPLARY EMBODIMENTS OF THE INVENTION

Figure 1:
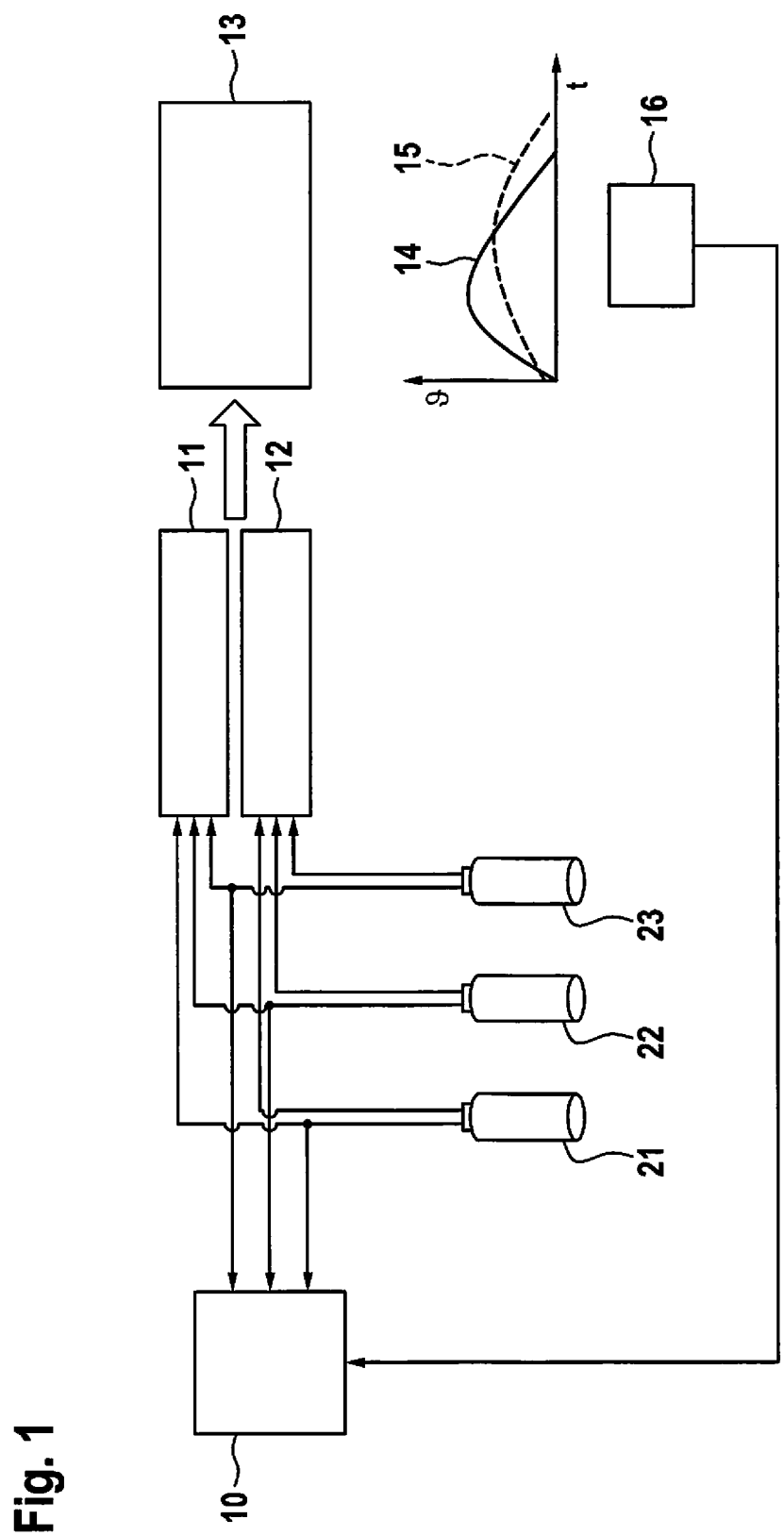
FIG. 1 schematically shows a system which can be operated by means of exemplary embodiments of the method according to the invention.

A system depicted in FIG. 1, in which a primary process and one or more secondary processes can run, has a controller 10, which controls the primary process and the secondary processes. Three sensors 21, 22, 23 provide initial data 11 to the controller 10, which uses the data 11 to control and monitor the primary process. In addition to this first data 11, each of the sensors 21, 22, 23 further detects second data 12. This can be achieved by the sensors 21, 22, 23 having a plurality of sensor elements in their housing which detect a plurality of different measured variables. A subset is formed from the first data 11 and the second data 12 and subjected to an analysis 13 in the form of a pattern query. FIG. 1 depicts in a diagram how the course of a sensor data pattern 14 differs with time t from a reference pattern 15 with which it is compared in the pattern query. The result 16 of this comparison is made available to the controller 10 for use in the secondary process. In doing so, the use of the result 16 takes place in different steps of each secondary process.

Figure 2:
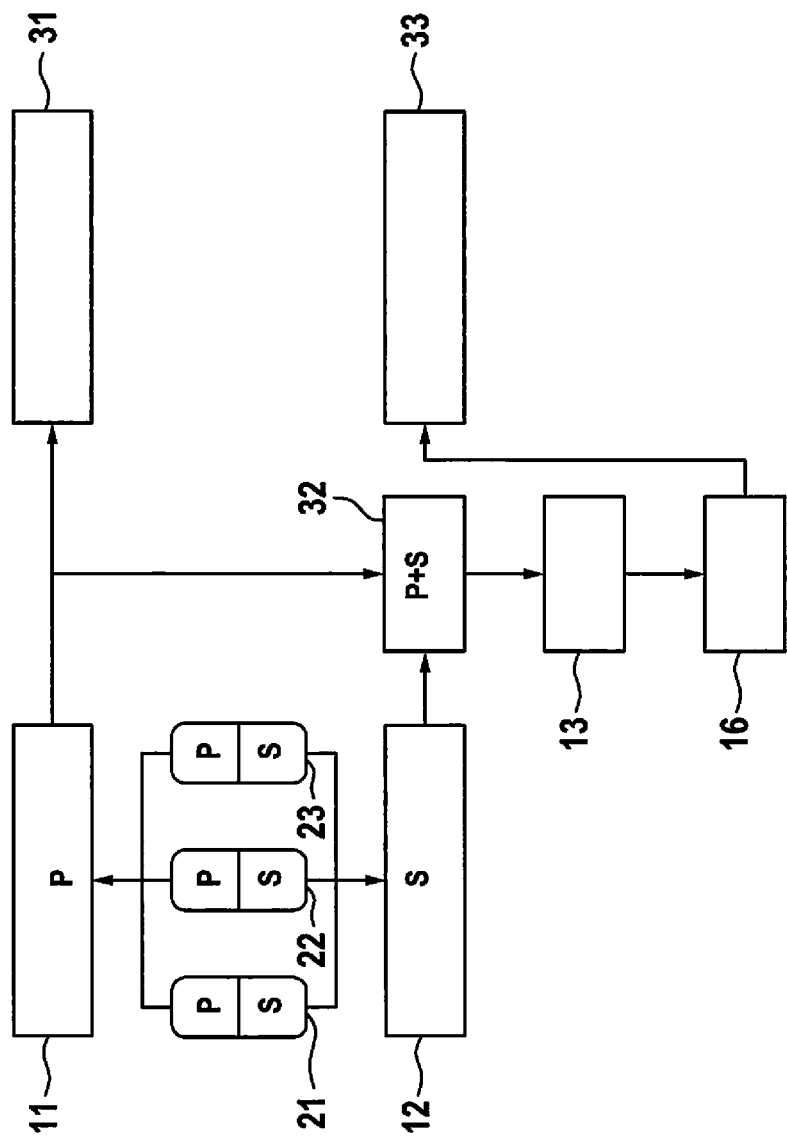
FIG. 2 schematically shows data streams in an exemplary embodiment of the method according to the invention.

The data streams flowing here are depicted in FIG. 2. Single values P of the first data 11 are provided by the sensors 21, 22, 23. These are made available to the primary process 31. In addition, single values S of the second data 12 are provided by the sensors 21, 22, 23. These are combined with the first data 11 to form a data set 32. A subset of this data set 32 is subjected to the analysis 13. The result 16 of the analysis 13 is made available to the secondary process 33. The course of the primary process 31 and/or the secondary process 33 can subsequently lead to changes in the first data 11 and/or in the second data 12, which in turn can be measured by the sensors 21, 22, 23.

Figure 3:
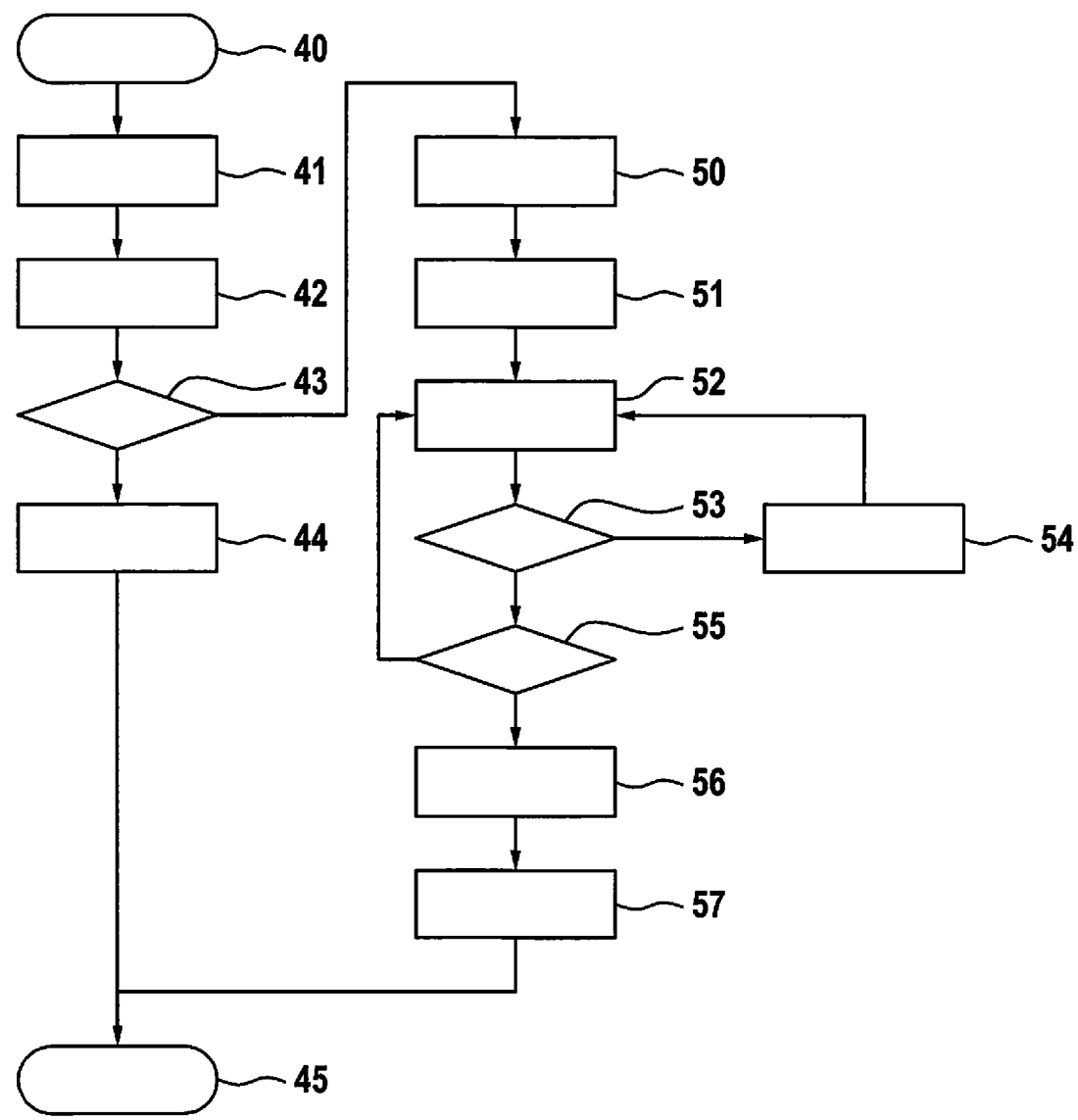
FIG. 3 shows a flow chart of an exemplary embodiment of the method according to the invention.

The use of the result 16 is depicted in FIG. 3 in an exemplary embodiment of a generic secondary process 33. After a start 40 of the process, a selection 41 of subsets of the first sensor data 11 and the second sensor data 12 is made to perform analyses 13, based on the results 16 of which it can be decided whether a secondary process 33 should be started. In addition, the sensors 21, 22, 23 are selected, which are most suitable for detecting these sensor data. Limits and tolerances for the pattern queries are also defined. Then, an execution 42 of the pattern queries takes place, which in the present exemplary embodiment is done, for example, by means of a neural network. In an evaluation 43, it is checked whether one of the results 16 is a sufficient match between a sensor data pattern 14 and a reference data pattern 15 for starting one of the secondary processes 33. If this is not the case, an occurrence notification is generated 44, by means of which these results 16 of the pattern query 13 can be stored in a computing device. Then a termination 45 of the process takes place.

However, if a sufficient match is found between a sensor data pattern 14 and at least one reference pattern 15 for the start of a secondary process 33, then a triggering 50 of this secondary process 33 occurs. Then, depending on this secondary process 33, subsets of the first data 11 and the second data 12 are again selected 51 to be used for pattern queries 13 in the further course of the process. Furthermore, reference patterns 15 are assigned to the selected sensor data. Repeated execution 52 of pattern queries 13 between the sensor data patterns 14 based on the newly compiled subsets and the reference patterns 15 is now performed, and their results 16 are subjected to two checks 53, 55. If the first check 53 finds that the sensor data pattern 14 deviates sufficiently from the reference pattern 15 to require an adjustment of the secondary process 33, this adjustment 54 is performed. If the second check 55 determines that the sensor data pattern 14 sufficiently matches a reference pattern 15 for terminating the secondary process 33, the secondary process 33 is terminated 56, an occurrence notification is generated 57, and then the method is terminated 45. The results 16 of the pattern queries 13 are also stored for documenting the secondary process 33.

In the exemplary embodiment of the method described below, the primary process 31 is a food manufacturing process. Furthermore, four secondary processes 33 are provided, which can be triggered, monitored and documented by means of results 16 of pattern queries 13:

The first secondary process 33 is a cleaning of one of the sensors 21, 22, 23, which is designed as a capacitive or optoelectronic sensor. The subset of the sensor data used to trigger the first secondary process 33 includes the signal quality of the sensor. If this falls below a threshold value, this indicates contamination on the sensor and cleaning is triggered. When monitoring the first secondary process 33, the subset of sensor data includes the temperature on the sensor to be cleaned. If this becomes so high that damage to the sensor is imminent, or so low that it is insufficient for cleaning, adjustment of the first secondary process 33 is required. The deviation of a sensor data pattern 14 of the temperature from a reference pattern 15 is also documented in the first secondary process 33.

A second secondary process 33 consists of immediate troubleshooting to be performed by an operator. This is, for example, bending one of the sensors 21, 22, 23 back to its target position, removing an incorrect part from the system, retightening a nut, or readjusting the tension of a conveyor belt. The subset of sensor data used to trigger the second secondary process 33 includes vibration, inclination and temperature data. In this case, the triggering is done by visualising the need for immediate troubleshooting to the operator. When monitoring, the subset also includes inclination, temperature and vibration data. Based on these, it is continuously visualised to the operator whether these sensor data are back within the target range. A change in inclination when returning to the correct position is documented.

The third secondary process 33 consists of performing regular maintenance. This can be the same measures that have to be carried out in the case of immediate troubleshooting. Triggering the third secondary process 33 is done using the same subset of sensor data as in the second secondary process 33, i.e. vibration, inclination and temperature data. However, if triggering is required, it is not visualised to the operator as needing immediate intervention, but instead he/she is prompted to wait until the next scheduled maintenance appointment to take the action. With regard to monitoring and documenting the third secondary process 33, the same sensor data is used as in the second secondary process 33.

The fourth secondary process 33 consists of a readjustment of process parameters of the primary processes 31, such as a covered route of a drive when folding a cardboard box in which the food is to be packed. The subset of the sensor data for triggering the fourth secondary process 33 includes humidity and temperature. During readjustment, monitoring is performed by sensor data from a position sensor to record the new readjusted position. The same position data is also documented.

In the following, two further secondary processes 33 are described, which can be monitored and documented by means of an exemplary embodiment of the method according to the invention, but whose triggering is not based on the result of a pattern query 13:

In a fifth secondary process 33, which may be a changeover process, a format change or a recipe change of the food to be prepared, an RFID reading head is to be brought into a new position. When monitoring this fifth secondary process 33, the inclination of the RFID reading head is detected and its position is further varied if the inclination does not yet correspond to its target value. The inclination is also documented.

A sixth secondary process 33 is a set-up operation. In such a set-up operation, production takes place at reduced speed with the door to the machine room open. A safety device is switched off. The setup operation is monitored by means of a subset of the sensor data, which includes vibration data, inclination data, temperature data and humidity data. This is condition monitoring. This same subset of sensor data is also the basis for the documentation.

The invention claimed is:

1. A method for operating a system which has a plurality of sensors (21, 22, 23), wherein the plurality of sensors (21, 22, 23) provide first sensor data (11) of a primary process (31), and the plurality of sensors (21, 22, 23) further provide second sensor data (12), said method comprising:

at least a part of the first sensor data (11) and the second sensor data (12) is subjected to an analysis (13) and a result (16) of the analysis (13) is used in at least one secondary process (33) of the primary process (31);

wherein the analysis is a pattern query (13), in which a comparison is performed on at least one sensor data pattern (14) with at least one reference pattern (15), if the at least one sensor data pattern (14) deviates from the at least one reference pattern (15) by at least a predetermined tolerance, the at least one secondary process (33) is triggered (50) or terminated (56) depending on the result (16); and wherein the at least one reference pattern (15) is changed during the at least one secondary process (33) by a learning process.

2. The method according to claim 1, wherein the part of the first sensor data (11) and the second sensor data (12) is selected (41, 51) depending on the at least one secondary process (33).

3. The method according to claim 1 wherein the result is used to monitor the at least one secondary process (33).

4. The method according to claim 1, wherein the result is used to document the at least one secondary process (33).

5. The method according to claim 1, wherein the result (16) is used to generate (44) an occurrence notification of the at least one secondary process (33).

6. A non-transitory machine-readable storage medium containing a computer program executable by a computing device for operating a system which has a plurality of sensors (21, 22, 23), wherein the plurality of sensors (21, 22, 23) provide first sensor data (11) of a primary process (31), and the plurality of sensors (21, 22, 23) further provide second sensor data (12), the computer program:

subjecting at least a part of the first sensor data (11) and the second sensor data (12) to an analysis (13) and using a result (16) of the analysis (13) in at least one secondary process (33) of the primary process (31);

wherein the analysis is a pattern query (13), in which a comparison is performed on at least one sensor data pattern (14) with at least one reference pattern (15), if the at least one sensor data pattern (14) deviates from the at least one reference pattern (15) by at least a predetermined tolerance, the at least one secondary process (33) is triggered (50) or terminated (56) depending on the result (16); and wherein the at least one reference pattern (15) is changed during the at least one secondary process (33) by a learning process.

* * * * *